United States Patent [19]

Hectors

[11] 4,052,210

[45] Oct. 4, 1977

[54] ELECTROPHOTOGRAPHIC COPYING PROCESS AND REPRODUCTION ELEMENT

[75] Inventor: Adrianus M. P. Hectors, Tegelen, Netherlands

[73] Assignee: Oce-van der Grinten N. V., Venlo, Netherlands

[21] Appl. No.: 701,206

[22] Filed: June 30, 1976

[30] Foreign Application Priority Data

July 4, 1975 Netherlands .......................... 7507972

[51] Int. Cl.$^2$ .......................... G03G 5/04; G03G 5/09; G03C 1/10
[52] U.S. Cl. .................................... 96/1.5 R; 96/1.6; 96/99
[58] Field of Search ............................ 96/1.5, 1.6, 99; 252/501

[56] References Cited

U.S. PATENT DOCUMENTS

| 2,294,893 | 9/1942 | Carroll et al. | 96/99 |
| 3,977,870 | 8/1976 | Rochlitz | 96/1.6 |

*Primary Examiner*—David Klein
*Assistant Examiner*—Louis Falasco
*Attorney, Agent, or Firm*—Albert C. Johnston

[57] ABSTRACT

In electrophotographic copying processes use is made of a reproduction element comprising on a conductive support a photoconductive layer containing dispersed in a binder a bisazo naphthol compound having a certain structure of substituents whereby the reproduction element exhibits relatively high light-sensitivity and is repeatedly exposable and developable imagewise so as to be useful for indirect electrophotographic copying. Special binder compositions enhance the light-sensitivity of the element and special layer constructions are provided to suit it for certain uses.

24 Claims, No Drawings

ELECTROPHOTOGRAPHIC COPYING PROCESS AND REPRODUCTION ELEMENT

This application relates to an electrophotographic copying process in which a latent image is formed on an electrophotographic reproduction element comprising a conductive support and a photoconductive layer, the photoconductive layer containing a bisazo naphthol compound.

Such a copying process is already known from the Dutch patent application No. 6918380, laid open to public inspection. With the aid of the electrophotographic plate described in that application, the drawbacks inherent to the use of a plate of which the photoconductive layer comprises an inorganic photoconductive material in the form of particles dispersed in an insulating binder, would be largely met already. The drawbacks of plates based on an inorganic pigment, such as ZnO, are:

1. these plates even when dye-sensitized have a sensitivity that is in fact still too low in practice, for it is lower than that of a selenium layer,
2. the plates are generally considered to be not reusable, whereas selenium plates are, and
3. as against a selenium layer that is positively charged, the plates can be charged only by negative corona discharge. A positive corona discharge is preferably used, as negative corona discharge generates considerably more ozone, being injurious, than positive corona discharge while, in addition, a negative corona discharge is more difficult to control than a positive one.

As appears from the examples of the said patent application No. 6918380 equivalent to British Patent 1,296,390 the xerographic plates according to that invention have a light-sensitivity not exceeding 435 lux-sec., whereby it should be remembered that the luxsec. indication decreases proportionally to the increase of light-sensitivity of the plate. Considering that with sensitized ZnO it is possible to arrive at a light-sensitivity of from 15 to 30 luxsec. and with selenium to approximately 10 luxsec., it will be clear that the light-sensitivity of those plates can still be considerably improved, as a matter of fact has to be improved, before they are practically applicable in an electrophotographic copying process.

The objection of too low a light-sensitivity in practice is met by the present invention in that, because of the choice of specific, entirely different bisazo naphthol compounds, it can provide reproduction elements having a considerably higher light-sensitivity, as a result of which the copying process proceeds in a quicker and simpler way.

SUMMARY OF THE INVENTION

The invention relates to an electrophotographic copying process of the kind mentioned in the opening paragraph of this application, which is characterized by the use of a reproduction element in which the bisazo naphthol compound has been dispersed in a binder and has the general formula I as follows:

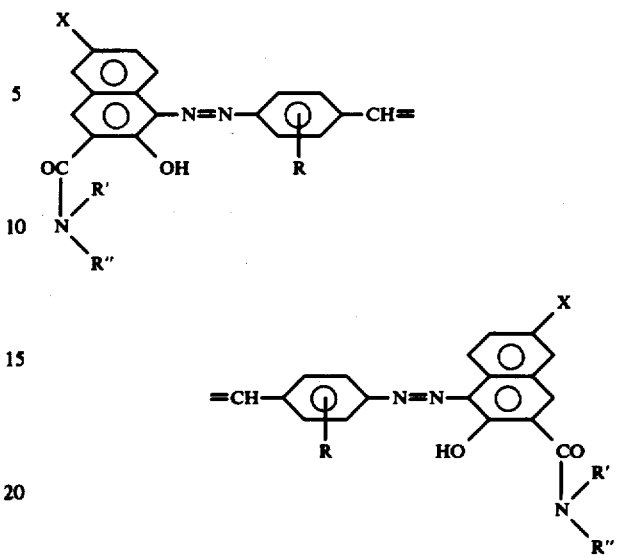

wherein R represents hydrogen, or one or more $OCH_3$ or $OC_2H_5$ groups, or one or more chlorine or bromine atoms; X is hydrogen, chlorine or bromine; R' is hydrogen, or a substituted or non-substituted aryl, heterocyclic aryl, aralkyl or lower alkyl group, and R" is hydrogen or a substituted or non-substituted lower alkyl or cycloalkyl group, or wherein R' and R" constitute together with the nitrogen atom a saturated or non-saturated, optionally substituted, 5 or 6 ring.

A lower (cyclo)alkyl group is understood to mean hear a (cyclo)alkyl group having at most eight carbon atoms such as methyl, ethyl, propyl, iso-propyl, hexyl, octyl, cyclopentyl, cyclohexyl and cyclo-octyl. Alternatively, the alkyl group may also be an unsaturated one, such as an allyl group. The alkyl or cycloalkyl group may carry one or more of the usual substituents such as amino, hydroxy, alkoxy or halogen. The aryl group may carry one or more of the substituents usual for an aryl group such as alkyl, alkoxy, halogen, carboxyl, ester or nitro. The heterocyclic 5 or 6 ring R' and R" can constitute together with the nitrogen atom, may contain one or more hetero-atoms, such as N and O, in addition to the nitrogen atom. Cyclic structures, such as piperidine, morpholine and pyrrolidine, may particularly be considered.

With the aid of the bisazo naphthol compounds outlined above, it is possible to obtain an electrophotographic reproduction element that is reusable, so also applicable in the indirect copying process in which the image formed on the photoconductive layer is transferred to a sheet of receiving material;

can be charged both positively and negatively; the best results are obtained, however, with positive charging. Although the Dutch patent specification No. 6918380 referred to before mentions on page 3 that the binder type plate containing an inorganic pigment (read ZnO) is disadvantageous in that it can be charged only by means of negative corona discharge — resulting in the drawbacks outlined above — thus making it undesirable in practice, whereas the binder type plate according to the invention disclosed in the said application would not show that drawback, from the fact that in nine examples out of ten the plate is negatively charged for all that it follows, that the best results are obviously not obtained with positive charging;

has a considerably higher light-sensitivity, one can say by at least a factor of 20, than the best reproduction element known from the said Dutch patent application.

Excellent results are obtained in particular with compounds wherein R represents a hydrogen, chlorine or bromine atom. In addition, X and R" preferably represent hydrogen, and R' is a lower alkyl group or phenyl group, which may be substituted.

Compounds that are suitable according to the invention include those of the formula referred to before, wherein the symbols X, R, R' and R" have the meanings shown in the following table:

TABLE A

|    | X  | R     | R'                  | R"   |     | X | R | R'            | R"    |
|----|----|-------|---------------------|------|-----|---|---|---------------|-------|
| 1. | H  | H     | iso-propyl          | H    | 9.  | H | H | p-nitrophenyl | H     |
| 2. | H  | H     | t-butyl             | H    | 10. | H | H | ethyl         | ethyl |
| 3. | H  | H     | phenyl              | H    | 11. | H | H | benzyl        | H     |
| 4. | H  | 3-OCH₃| phenyl              | H    | 12. | H | H | —(CH₂)₂O(CH₂)₂— |     |
| 5. | H  | 3-Cl  | phenyl              | H    | 13. | H | H | -CH₂CH₂Cl     | H     |
| 6. | Br | H     | phenyl              | H    | 14. | H | H | 2'-pyridinyl  | H     |
| 7. | H  | 2-Br  | —(CH₂)₃—            |      | 15. | H | H | p-methoxy-phenyl | H  |
| 8. | H  | 3-Br  | iso-propyl          | H    |     |   |   |               |       |

The binder with which the bisazo naphthol compounds can be deposited on a conductive substrate may be insulating or photoconductive, or an insulating binder made photoconductive by additives.

Examples of insulating binders are polymers or copolymers of: styrene, vinyl chloride, vinylidene chloride, (meth)acrylates, vinyl ethers, vinyl esters and vinyl acetals.

Photoconductive binders include: polyvinyl napthalene, poly-9-vinylanthracene, poly-N-vinylcarbazole (PVK), substituted PVK such as brominated, chlorinated, iodated or nitrated PVK, and polyvinylpyrene (PVPy) or substituted PVPy such as brominated, chlorinated or nitrated PVPy. Also a mixed substituted PVK or PVPY, e.g., a brominated-nitrated PVPy as described in Dutch patent application Ser. No. 7407633, is a suitable binder. Preferably, a substance increasing the light-sensitivity is added to these polymeric photoconductors functioning as binders. Excellent results are attained by adding electron acceptors such as 2,4,7-trinitrofluoren-9-on (TNF), 2,4,7-trinitrofluoren-9-dicyanomethylene (DTF), 1,3,7-trinitrodibenzothiophene-5,5-dioxide (TNDBTO₂) or one of the fluoren-9-ylidene-anilines described in U.S. Pat. No. 3,935,009, in particular with N-(2,4,7-trinitrofluoren-9-ylidene)-aniline and with the p- or m-nitro-N-(2,4,7-trinitrofluoren-9-ylidene)-aniline.

As examples of insulating binders made photoconductive by additives, reference may be made to the insulating binders mentioned above, to which an electron donor or electron acceptor has been added.

Examples of electron donors are N-alkylcarbazole such as N-ethylor N- isopropylcarbazole, 2,5-bis(4-aminophenyl)-1,3,4-oxadiazole, 2,5-bis(4-dialkylaminophenyl)-1,3,4-oxadiazole such as 2,5-bis(4- diethylaminophenyl)-1,3,4-oxadiazole, or one of the compounds described in U.S. Pat. No. 3,852,065.

Examples of electron acceptors are the acceptors TNF, DTF, TNDBTO₂ just referred to, or one of the anilines described in U.S. Pat. No. 3,935,009.

Preferably, the binder is a combination of PVK or PVPy with one of the following electron acceptors: TNF, TNDBTO₂, N-(2,4,7-trinitrofluoren-9-ylidene)-aniline or p- or m-nitro-N-(2,4,7-trinitrofluoren-9-ylidene)-aniline.

The mole-proportion acceptor to photoconductive polymer, calculated to the monomeric unit thereof, may vary from 1 : 100 to 1 : 1 but, preferably, it lies in the range between 1 : 20 and 1 : 3.

The weight ratio pigment to finder may vary from 1 : 100 to 1 : 2 but, preferably, it lies in the range between 1 : 20 and 1 : 4.

To facilitate the application of the light-sensitive layer and/or to increase its mechanical strength, one or more plasticizers may be added to the binder, if desired. Examples thereof are: polycarbonate, chlorinated diphenyl, m-terphenyl, diphenyl, diphenylether, methylnaphthalene, chlorinated aliphatic esters, dioctyl phthalate, triphenyl phosphate, triphenyl phosphite or an epoxy resin.

In those cases where the binder is photoconductive, or has been made photoconductive, it does not function, or not exclusively so, as a photoconductor but rather as a means of transport for the charge carriers generated by the bisazo compound under the influence of light.

It might be termed an electro-active binder.

To obtain an electrophotographic reproduction element that is suitable for use in the copying process according to the invention, the bisazo naphthol compound is distributed in a solution of the binder. The bisazo naphthol compound does not dissolve in it but a dispersion results. Hence the bisazo naphthol compound is considered to be a pigment. For this reason, from now on it will be referred to as the azo pigment (with or without the addition: according to the invention).

On an average, the azo pigment according to the invention has a diameter which preferably does not exceed 3 μ and, more particularly, is 1 μ or smaller.

With the aid of one of the conventional coating techniques a thin layer of this dispersion is applied to a conductive support. The support may have the form of a sheet, plate, drum or belt. As material for the conductive support may be considered, inter alia, metal (nickel or aluminium, e.g.), paper or plastic which are both provided with a conductive layer (a metal layer or a carbon-binder type layer, e.g.), paper made thoroughly conductive, or NESA glass, i.e. glass provided with a thin transparent layer of tin oxide.

The thickness of the applied photoconductive layer, measured after drying, can vary within fairly wide limits: from 2 to 100 μ. Particularly suitable layers are obtained with coatings of 2-30 μ. If desired, one or more interlayers may be applied between the support and the photoconductive layer. It may be desired, for instance, to apply as an interlayer an adhesive layer, barrier layer or a layer yielding a higher contrast.

In addition, an approximate 1-2 μ thin coating, mostly being an insulating material, may be applied on top of the photoconductive layer. For example, this coating may have been applied for obtaining a protective overcoating, a smoother surface or a higher degree of charging.

Another particularly good embodiment of the copying process according to the invention resides in that it starts from a reproduction element in which the photoconductive layer consists of more coatings instead of one. For instance, the pigment may be caused to deposit first in a thin layer on the conductive support, which is then over-coated with the electro-active binder. By so doing, the two functions the photoconductive layer with binder structure, described before, had to perform, viz. charge generation and charge transport, are now divided over two layers: under the influence of the light, the pigment layer provides for charge carriers and the electro-active binder for their transport. Instead of applying a pigment layer by evaporation it is also possible to apply the pigment in a thin layer to the support by using a small amount of binder and then to overcoat the whole with a (considerably thicker) layer of the electroactive binder. Preferably, also the binder with which the pigment is coated onto the support is electro-active and identical to the electro-active binder to be applied subsequently.

It will be clear that for said multi-layer configuration either the support, or the layer or layers applied to the chargeinjecting pigment coating, must be considerably transparent to the light used.

If such is not the case, no or insufficient light will reach the pigment coating, and no or insufficient charge carriers can be formed by the pigment.

The reversed order of the layer configuration is also possible. It is possible to coat the support first with a transporting layer which is subsequently coated with a charge-generating layer.

The copying process according to the invention, no matter which embodiment of the reproduction element is chosen — either the binder structure or the multilayer structure — may be both the direct and the indirect process. With the direct process the latent image formed on the reproduction element is both developed and fixed. With the indirect process the latent image is either first transferred to a receiving material, such as paper, and developed and fixed on it, or is first developed, after which the loose powder image is transferred to a receiving material and fixed on it.

The invention also relates to the product obtained with the aid of the electrophotographic copying process according to the invention, i.e. to the copy. This copy can be obtained both in accordance with the direct and the indirect copying process.

The invention further relates to an electrophotographic reproduction element suitable for using the copying process according to the invention. This reproduction element which comprises a conductive support and a photoconductive layer, the photoconductive layer containing a bisazo naphthol compound, is characterized in that the bisazo naphthol compound has been dispersed in a binder, and has the general formula I set forth above, wherein R represents hydrogen, or one or more $OCH_3$ or $OC_2H_5$ groups, or one or more chlorine or bromine atoms; X is hydrogen, chlorine or bromine; R' is hydrogen or a substituted or non-substituted aryl, heterocyclic aryl, aralkyl or lower alkyl group, and R" is hydrogen or a substituted or non-substituted lower alkyl or cycloalkyl group; or wherein R' and R" constitute together with the nitrogen atom a saturated or non-saturated, optionally substituted, 5 or 6 ring.

Preferably, R represents a hydrogen, chlorine or bromine atom. In addition, the compounds in which X are R" each represent a hydrogen atom, and R' a lower alkyl group or a phenyl group which may be substituted, are particularly preferred.

Preferably, the binder is a combination of PVK or PVPy with one of the following electron acceptors: TNF, $TNDBTO_2$, N-(2,4,7-trinitrofluoren-9-ylidiene)-aniline or p- or m-nitro-N-(2,4,7-trinitrofluoren-9-ylidene)-aniline, whereby a mole-proportion acceptor to photoconductive polymer lying between 1 : 20 and 1 : 3 and a weight ratio pigment to finder ranging from 1 : 20 to 1 : 4 is preferred.

On an average, the bisazo pigment particles to be used preferably have a diameter that is smaller than 3 $\mu$ and, in particular, it is smaller than 1 $\mu$.

The photoconductive layer preferably has a thickness between 2 and 30 $\mu$.

Besides the one-layer structure in which the azo pigment has been dispersed in a binder, the previously described multi-layer structure of the photoconductive layer is a particularly appropriate embodiment of the reproduction element according to the invention.

The invention relates at the same time to a process for manufacturing a reproduction element according to the invention. This process is characterized in that a conductive support is coated with a photoconductive layer containing a bisazo naphthol compound with the general formula I set out above, in which formula X, R, R' and R" have the meanings indicated before.

Starting from 4,4'-diaminostilbene, the bisazo pigments can be prepared following the steps known per se and conventional in organic chemistry, viz. diazotation and coupling with the azocoupling component being a Naphthol AS in this case. The following worked out preparing method of the azo-dyestuff obtained from 4,4'-stilbenebis(diazonium)bis(tetrafluoroborate) and 3-hydroxy-N-isopropyl-2-naphtamide (compound No. 1 of the table A above) may serve as an example of how all the azo pigments can be prepared.

4.2 g of 4,4'-diaminostilbene were dissolved in 8.8 ml of 13N HCl and 28 ml of water. The two amino groups were diazotized with a solution of 3 g of $NaNO_2$ in 10 ml of water, taking care that the temperature remained about 0° C. The resulting solution was filtered on activated charcoal and the diazo compound in the filtrate was precipitated by dropwise adding 10 ml of $HBF_4$ (50 percent.) to it.

The precipitate was sucked off and washed with a small amount of cold water. This precipitate was dissolved in 100 ml of dimethylformamide (DMF) and added to a solution, cooled to 5° C, the solution containing 8 g of 3-hydroxy-N-isopropyl-2-naphthamide in 400 ml of DMF. After 20 g of sodium acetate in 50 ml of water had been added to this mixture, it was stirred for half an hour at 10° C, subsequently, stirred again for two hours at room temperature. The precipitate was sucked off and, while stirring, treated with 800 ml of water. The precipitate was sucked off again and, while stirring, now treated with 400 ml of DMF. After the precipitate had been sucked off again, it was washed with ethanol (95%) and water, and dried. A blue-violet product in an amount of 6.6 g was yielded.

The results of the elementary analysis were as follows: calculated: 73.0% C: 5.5% H: 12.2% N: 9.3% 0: found : 72.4% C: 5.6% H: 12.1% N: 9.9% 0:

It must be noted that for coupling with the Naphthol AS it is not necessary to isolate the diazonium compound.

The same process as followed for preparing the azo pigment from 4,4'-stilbenebis(diazonium)bis(tetrafluoroborate) and 3-hydroxy-2-naphtanilide (the compound No. 3 of the table A above) resulted in the following:

calculated: 76.0% C: 4.5% H: 11.1% N: 8.4% 0: found: 75.3% C: 4.6% H: 11.0% N: 8.6% 0.

The examples below, which should not be considered as limitative, serve to illustrate the copying process of the invention as well as the reproduction element to be used in it. If not indicated otherwise, the exposure was effected with a glowlamp and the light-intensity was 10 lux.

The light-sensitivity is expressed in luxseconds (lxs.).

The "10% light-sensitivity" and "25% light-sensitivity", respectively, then give the number of lxs. required to reduce the potential to 10% and 25%, respectively, of the initial value.

The pigment chosen is indicated by the number shown in the table A.

Unless otherwise stated, the reproduction element is dried at room temperature.

EXAMPLE 1

Five electrophotographic reproduction elements, of which the photoconductive layer was composed of a photoconductive binder, namely, PVK (Luvican M170, from B.A.S.F.) and a pigment according to the invention dispersed therein in the weight ratio 5 : 1, were prepared as follows:

1.125 g of PVK dissolved in 7.5 ml of chlorobenzene and 7.5 ml of 1,4 -dioxane and 0.225 g of pigment were put into a steel jar (a grinding bucket) of 100 ml capacity filled with approximately 30 ml of steatite balls having a diameter of about 10 mm. The grinding bucket with its contents was caused to rotate for 50 hours on a so-called roller milling stand. The balls were then removed. With the resulting dispersion a thin aluminium plate was coated with a photconductive layer which, after drying, had a thickness of approximately 3 μ. To determine its light-sensitivity, the reproduction element so obtained was charged — both positively and negatively - and, subsequently, exposed uniformly.

The pigments chosen were the numbers 1 up to and including 5 of the table A above.

The results are indicated in the following table B.

TABLE B

| pigment | negatively charged | 10% light-sensitivity | positively charged | 10% light-sensitivity |
|---|---|---|---|---|
| no. 1 | 305 V | 110 lxs | 380 V | 115 lxs |
| 2 | 295 V | 285 lxs | 395 V | 43 lxs |

TABLE B-continued

| pigment | negatively charged | 10% light-sensitivity | positively charged | 10% light-sensitivity |
|---|---|---|---|---|
| 3 | 335 V | 250 lxs | 365 V | 140 lxs |
| 4 | 215 V | 170 lxs | 215 V | 50 lxs |
| 5 | 310 V | 440 lxs | 440 V | 63 lxs |

From this example it appears that positively charged layers generally have a higher light-sensitivity than negatively charged layers.

EXAMPLE 2

Replacement of the photoconductive binder PVK as in Example 1 by an insulating binder, namely, a styrene-acrylate copolymer (Pliolite AC), or by a binder made conductive by additives, viz. the combination Pliolite AC with 2,5-bis(4-diethylaminophenyl)-1,3,4-oxadiazole in the 5 : 1 ratio, gave the following results:

TABLE C

| binder | pigment | negatively charged | 25% light-sensitivity | positively charged | 25% light-sensitivity |
|---|---|---|---|---|---|
| Pliolite AC; ratio of binder to pigment = 5 : 1 | no. 3 | 840 V | 285 lxs | 595 v [1] | 145 lxs [1] |
| Pliolite AC + oxadiazole; ratio of Pliolite to oxadiazole to pigment = 5 : 1 : 1 | no. 3 | 620 V | 240 lxs | 550 V | 200 lxs |

[1] results after being charged and exposed for the 2nd time.

EXAMPLE 3

The binder in this example was an electro-active binder, and consisted of the combination PVK with TNF in the moleproportion 10 : 1. The weight ratio binder to pigment was also 10 : 1. The preparation of the tested electrophotographic reproduction elements was effected as follows:

10 ml of a 15 percent. solution of PVK in chlorobenzene plus a solution of 0.244 g of TNF in 10 ml of 1,4-dioxane as well as 0.174 g of pigment were brought together in a grinding bucket of 100 ml capacity filled with approximately 30 ml of steatite balls having a diameter of about 10 mm. The grinding bucket with its contents was caused to rotate for 50 hours on a roller milling stand, after which the balls were sieved.

With the dispersion so obtained a thin aluminium plate was coated with a photoconductive layer which, after drying, had a thickness of approximately 3 μ. To determine its light-sensitivity, the reproduction element thus prepared was charged — both positively and negatively — and, subsequently, exposed uniformly. The pigments chosen were the numbers 1 to 6 inclusive, 9, and 14 of the table A.

The results are shown in the following table.

TABLE D

| pigment | negatively charged | 10% light-sensitivity | positively charged | 10% light-sensitivity |
|---|---|---|---|---|
| no. 1 | 240 V | 19 lxs | 260 V | 17 lxs |
| 2 | 230 V | 36 lxs | 240 V | 17 lxs |
| 3 | 210 V | 33 lxs | 230 V | 18 lxs |
| 4 | 165 V | 41 lxs | 215 V | 24 lxs |
| 5 | 300 V | 44 lxs | 290 V | 15 lxs |
| 6 | 260 V | 115 lxs | 280 V | 68 lxs |
| 9 | 140 V | 95 lxs | 215 V | 75 lxs |
| 14 | 195 V | 84 lxs | 210 V | 100 lxs |

Also from this example it appears that a positively charged element generally has a higher sensitivity than a negatively charged element. Further, elements according to the invention, if charged positively, show to be able highly light-sensitive.

ratio binder to pigment amounted to 10 : 1 each. The pigments used were the numbers 1 and 2 of the table A. The results were:

TABLE F

| pigment | acceptor | negatively charged | 10% light-sensitivity | positively charged | 10% light-sensitivity |
|---------|----------|--------------------|-----------------------|--------------------|-----------------------|
| no. 1 | TNDBTO$_2$ | 215 V | 28 lxs | 275 V | 17 lxs |
| 2 | TNF-anil | 255 V | 30 lxs | 270 V | 15 lxs |

EXAMPLE 4

The formulation of Example 3 was reworked, it being understood that 0.348 g of pigment was applied, so that the weight ratio binder to pigment was 5 : 1. The pigments used were the numbers 1 up to and including 5 of the table A above. The results are indicated in the following table E.

TABLE E

| pigment | negatively charged | 10% light-sensitivity | positively charged | 10% light-sensitivity |
|---------|--------------------|-----------------------|--------------------|-----------------------|
| no. 1 | 215 V | 31 lxs | 255 V | 11 lxs |
| 2 | 240 V | 40 lxs | 235 V | 14 lxs |
| 3 | 210 V | 61 lxs | 240 V | 18 lxs |
| 4 | 160 V | 59 lxs | 240 V | 17 lxs |
| 5 | 250 V | 55 lxs | 270 V | 10 lxs |

EXAMPLE 5

The formulation of Example 3 was reworked, it being understood that by applying 0.488 g of TNF and 0.199 g of pigment instead of the quantities indicated there, the mole-proportion PVK to TNF in the binder was brought to 5 : 1, whereas the weight ratio binder to pigment was maintained at 10 : 1. The pigment used was number 5 of the table A. The results were: a negative charge of 250V, a 10% light-snesitivity of 32 lxs a positive charge of 210V, a 10% light-sensitivity of 12 lxs.

EXAMPLE 6

The formulation of Example 3 was reworked. However, the quantities of TNF and pigment applied were increased to 0.488 g and 0.398 g, respectively, so that the mole-proportion PVK to TNF in the binder was 5 : 1, the weight ratio binder to pigment was also 5 : 1. Again, the pigment used was number 5 of the table A.
The results were:
a negative charge of 235V, a 10% light-sensitivity of 43 lxs
a positive charge of 245V, a 10% light-sensitivity of 11 lxs.

EXAMPLE 7

The formulation of Example 3 was reworked, it being understood that instead of TNF a few other electron acceptors were used, namely, the condensation product of TNF with aniline (abbreviated to TNF-anil) and TNDBTO$_2$. The quantities of PVK, electron acceptor and pigment applied were chosen in such a way that the mole-proportion PVK to the acceptor, and the weight

EXAMPLE 8

Using pigment number 3 of the table A, a coating dispersion in which the mole-proportion PVK to acceptor (TNF) amounted to 10 : 1 and the weight ratio binder to pigment 5 : 1 was prepared in accordance with the fomulation of Example 3. With the aid of this coating dispersion a thin aluminium plate was provided with a photoconductive layer which, after drying, had a thickness of approximately 3 $\mu$. Using the same dispersion, part of the electrophotographic material thus obtained was recoated, the resulting photoconductive layer having a thickness, after drying, of about 7 $\mu$. Part of the electrophotographic material so obtained was coated once again, the photoconductive layer having an overall-thickness, after drying, of approximately 11 $\mu$. So, three reproduction elements were obtained in this way: one of which the photoconductive layer was approximately 3 $\mu$, one of which the photoconductive layer was about 7 $\mu$, and one of which the photoconductive layer was approximately 11 $\mu$ thick. The three reproduction elements were then brought together in an oven and dried for 30 minutes at 130° C.

The measurements of the light-sensitivity, both with negative and positive charging showed the following results:

TABLE G

| photoconductive layer | negatively charged | 10% light-sensitivity | positively charged | 10% light-sensitivity |
|-----------------------|--------------------|-----------------------|--------------------|-----------------------|
| coated once : 3$\mu$ | 200 V | 46 lxs | 260 V | 16 lxs |
| coated twice : 7 $\mu$ | 395 V | 95 lxs | 540 V | 20 lxs |
| coated 3 times : 11 $\mu$ | 545 V | 135 lxs | 720 V | 28 lxs |

This table shows that indeed with positive charging the 10% light-sensitivity slightly decreases with thickening of the photoconductive layer, however the voltage drop per luxsec increases considerably.

For, when looking more closely at the three cases, 16 lxs proves to be necessary in the first case to drop the potential by 234 V, which is 14.6 V/lxs. Only 20 lxs is necessary in the second case to drop the potential by 486 V, which is 24.3 V/lxs. In the third case 28 lxs is necessary to drop the potential by 648 V, which is 23.1 V/lxs. From this it appears that with the same amount of light a greater voltage contrast is attainable with thicker layers.

EXAMPLE 9

This example can be considered a variant of Example 1. Instead of the PVK used there, as a binder was now used a polyvinylpyrene (PVPy), namely, monobrominated polyvinylpyrene (abbreviated to Br.PVPy) and polyvinylpyrene being nitrated by one-fourth (abbreviated to ¼NO$_2$.PVPy). the weight ratio binder to pigment was 5 : 1. The pigments used were the numbers 1 and 3 of the table A.

The coating dispersions were prepared as follows: A steel grinding bucket of 15 ml capacity was filled with 5 ml of steel balls (diameter approximately 1-2 mm) and one bigger steel ball (diameter approx. 8 mm).
0.750 g of the substituted PVPy The results of the light-sensitivity measurements, both with negative and positive charging, are stated in below table I.

TABLE I

| binder | pigment | negatively charged | 10% light-sensitivity | positively charged | 10% light-sensitivity |
|---|---|---|---|---|---|
| PVPy+TNDBTO$_2$ | no. 1 | 175 V | 44 lxs | 240 V | 30 lxs |
| PVPy+TNDBTO$_2$ | no. 2 | 210 V | 59 lxs | 255 V | 20 lxs |
| PVPy+TNDBTO$_2$ | no. 3 | 190 V | 65 lxs | 240 V | 28 lxs |
| PVPy+TNF-anil | no. 3 | 180 V | 81 lxs | 195 V | 36 lxs |
| PVPy+TNDBTO$_2$ | no. 5 | 215 V | 96 lxs | 250 V | 31 lxs |

0.150 g of the pigment
8 ml of o-dichlorobenzene
1 ml of 1,4-dioxane.

The whole was then shaken for 6 hours on a shaking device ("Red Devil"), after which the balls were screened. The dispersions thus obtained were further employed as described in Example 1. The results of the light-sensitivity measurements, recorded both with negative and positive charging, are stated below.

TABLE H

| binder | pigment | binder-pigment ratio | negatively charged | 10% light-sensitivity | positively charged | 10% light-sensitivity |
|---|---|---|---|---|---|---|
| Br . PVPy | no. 3 | 5 : 1 | 140 V | 140 lxs [1] | 145 V | 125 lxs |
| ¼ NO$_2$ . PVPy | no. 1 | 5 : 1 | 225 V | 140 lxs | 315 V | 30 lxs |

[1] value represents 25% light-sensitivity.

EXAMPLE 10

Again, the pigment was used in combination with an electroactive binder consisting, in this case, of a combination of PVPy with an electron acceptor.

The mole-proportion PVPy to acceptor was 10 : 1, the weight ratio binder to pigment was also 10 : 1. The electron acceptors used were TNDBTO$_2$ as well as the condensation product of TNF and aniline (abbreviated to TNF-anil), whereas as pigments the numbers 1, 2, 3 and 5 of the table A above were used.

The coating dispersions were prepared as follows: A steel grinding bucket of 15 ml capacity was filled with:
5 ml of steel balls (diameter 1–2 mm) and one bigger steel ball (diameter approximately 8 mm).
0.115 g of TNDBTO$_2$ or 0.128 g of TNF-anil
0.087 g of pigment
8 ml of chlorobenzene
2 ml of 1,4-dioxane.

The whole was then shaken for 6 hours on a shaking device ("Red Devil"), after which the balls were screened. The resulting dispersions were further employed as described in Example 1.

The following Examples 11 and 12 represent some results of reproduction elements according to the invention, in which the photoconductive layer consisted of two layers instead of one. In all cases, the charge-transporting layer consisted of the combination PVK and TNF in the mole-proportion 10 : 1. The binder of the charge-generating layer consisted either of PVK alone or of the conbination PVK and TNF in the mole-proportion 10 : 1. Where the binder of the charge-generating layer was PVK only, the weight ratio binder to pigment amounted to 5 : 1. Where the binder of the charge-generating layer consisted of the combination PVK + TNF, the weight ratio binder to pigment was either 10 : 1 or 5 : 1.

In all cases, the thickness of the layer initially applied to the support was approximately 3 μ, whereas the overall thickness of the photoconductive layer was 6 to 7 μ.

EXAMPLE 11

In this example the binder of the charge-generating layer was PVK only, and the pigments used related to the numbers 1, 3 and 4 of the table A above. Table J below represents the results of the light-sensitivity measurements, both with negative and positive charging. "1st layer" shall mean the layer that was initially applied to the support, "2nd layer" the subsequent layer.

From the results represented in Table J it appears that an element provided with a photoconductive double layer according to the configuration indicated has a considerably higher light-sensitivity with negative charging than with positive charging, whereas in all the forgoing examples a positively charged element had a light-sensitivity that was — often considerably — higher than a negatively charged element.

Table J

| photoconductive double layer | weight ratio | mole-proportion | pigment | negatively charged | 10% light-sensitivity | positively charged | 10% light-sensitivity |
|---|---|---|---|---|---|---|---|
| 1st layer: PVK-pigment | 50 | | no. 1 | 565 V | 25 lxs | approx. 800 V | 180 lxs |
| 2nd layer: PVK-TNF | | 10:1 | | | | | |
| 1st layer: PVK-pigment | 5:1 | | no. 3 | 390 V | 48 lxs | 505 V | 145 lxs |
| 2nd layer: PVK-TNF | | 10:1 | | | | | |
| 1st layer: PVK-pigment | 5:1 | | no. 4 | 460 V | 50 lxs | 855 V | 205 lxs |
| 2nd layer: PVK-TNF | | 10:1 | | | | | |

EXAMPLE 12

In this example the binder of the charge-generating layer consisted of the combination PVK and TNF in the mole-proportion 10 : 1, and the pigments used were the numbers 1, 2 and 3 of the table A above. Table K below represents the results of the light-sensitivity measurements, both with negative and positive charging.

"1st layer" shall mean the layer that was initially applied to the support, "2nd layer" the subsequent layer.

Also this table shows that an element provided with a photoconductive layer, of which the underlayer is the chargegenerating layer — as indicated in the first four cases — has a considerably higher light-sensitivity with negative charging than with positive charging. When, on the other hand, the order of the layers is reversed, as in the fifth case, the element has again a higher sensitivity with positive charging.

Table K

| photoconductive double layer | weight ratio | mole- prop. | pig- ment | negatively charged | 10% light- sensitivity | positively charged | 10% light- sensitivity |
|---|---|---|---|---|---|---|---|
| 1st layer: binder[1]-pigment | 10:1 | | no. 1 | 345 V | 13 lxs | 415 V | 100 lxs |
| 2nd layer: PVK-TNF | | 10:1 | | | | | |
| 1st layer: binder[1]-pigment | 10:1 | | no. 2 | 400 V | 18 lxs | 450 V | 105 lxs |
| 2nd layer: PVK-TNF | | 10.1 | | | | | |
| 1st layer: binder[1]-pigment | 10:1 | | no. 3 | 255 V | 24 lxs | 355 V | 95 lxs |
| 2nd layer: PVK-TNF | | 10:1 | | | | | |
| 1st layer: binder[1]-pigment | 5:1 | | no. 3 | 335 V | 33 lxs | 425 V | 105 lxs |
| 2nd layer: PVK-TNF | | 10:1 | | | | | |
| 1st layer: PVK-TNF | | 10:1 | no. 3 | 575 V | 145 lxs[2] | 500 V | 18 lxs |
| 2nd layer: binder[1]-pigment 10:1 | | | | | | | |

[1] the binder consists of the combination PVK-TNF in the mole-proportion 10 : 1.
[2] value indicates 25% light-sensitivity.

I claim:

1. Electrophotographic copying process in which a latent image is formed on an electrophotographic reproduction element comprising a conductive support and a photoconductive layer by charging and imagewise exposing said layer, the photoconductive layer containing a bisazo naphthol compound, characterized in that said reproduction element contains in dispersion in a binder a bisazo naphthol compound having the general formula

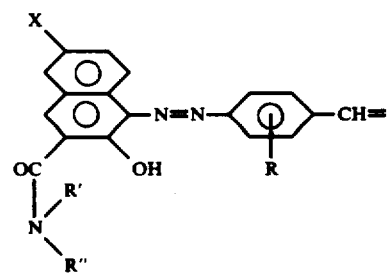

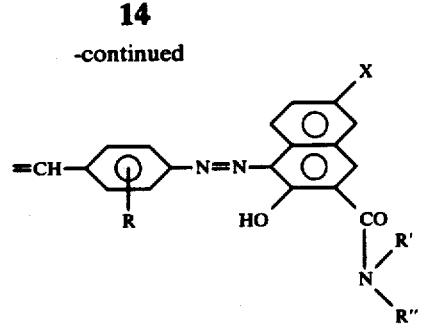

wherein R represents hydrogen or one or more $OCH_3$ or $OC_2H_5$ groups or one or more chlorine or bromine atoms; X is hydrogen, chlorine or bromine; R' is hydrogen or a substituted or non-substituted aryl, heterocyclic aryl, aralkyl or lower alkyl group, and R" is hydrogen or a substituted or non-substituted lower alkyl or cycloalkyl group, or R' and R" together with the nitrogen atom to which they attach constitute a saturated or non-saturated 5- or 6- membered ring.

2. Electrophotographic copying process according to claim 1 characterized in that R represents a hydrogen, chlorine or bromine atom.

3. Electrophotographic copying process according to claim 2, characterized in that both X and R" represent a hydrogen atom, and R' is a lower alkyl group or a phenyl group, which may be substituted.

4. Electrophotographic copying process according to claim 1, characterized in that the binder is a combination of poly-N-vinyl-carbazole or polyvinyl pyrene with one of the following electron acceptors: 2,4,7-trinitrofluoren-9-on; 1,3,7-trinitrodibenzothiophene-5,5-dioxide; N-(2,4,7-trinitrofluoren-9-ylidene)-aniline, or p- or m-nitro-N-(2,4,7-trinitrofluoren-9-ylindene)-aniline.

5. Electrophotographic copying process according to claim 4, characterized in that the mole-proportion acceptor to photoconductive polymer lies between 1 : 20 1 : 3.

6. Electrophotographic copying process according to claim 5, characterized in that the weight ratio pigment to binder lies between 1 : 20 and 1 : 4.

7. Electrophotographic copying process according to claim 1, characterized in that, on an average, the diameter of the azo-pigment particles does not exceed 3 μ.

8. Electrophotographic copying process according to claim 1, characterized in that, on an average, the diameter of the azo-pigment particles does not exceed 1 μ.

9. Electrophotographic copying process according to claim 1 characterized in that the thickness of the photoconductive layer lies between 2 and 30 μ.

10. Electrophotographic copying process according to claim 1, characterized in that the photoconductive layer is a composite of a plurality of coatings.

11. Electrophotographic reproduction element comprising a conductive support having thereon a photoconductive layer containing a bisazo naphthol compound, characterized in that said layer contains in dispersion in a binder a bisazo naphthol compound having the general formula

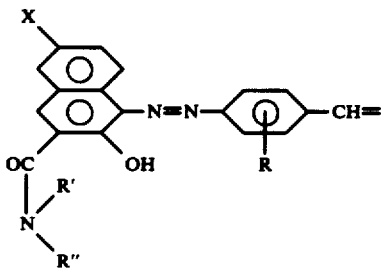

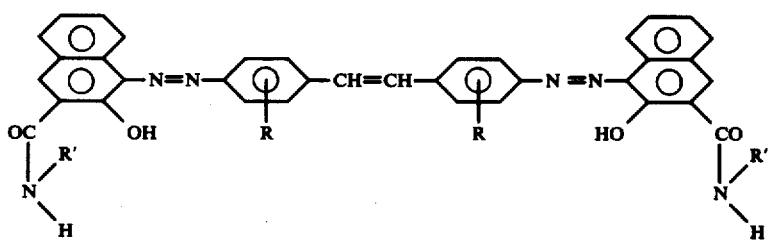

wherein R represents hydrogen or one or more $OCH_3$ or $OC_2H_5$ groups or one or more chlorine or bromine atoms; X is hydrogen, chlorine or bromine; R' is hydrogen or a substituted or non-substituted aryl, heterocyclic aryl, aralkyl or lower alkyl group, and R" is hydrogen or a substituted or non-substituted lower alkyl or cyloalkyl group, or R' and R" together with the nitrogen atom to which they attach constitute a saturated or non-saturated 5- or 6- membered ring.

12. Electrophotographic reproduction element according to claim 11, wherein R represents a hydrogen, chlorine or bromine atom.

13. Electrophotographic reproduction element according to claim 12, wherein X and R" represent a hydrogen atom, and R' is a lower alkyl group or a phenyl group, which may be substituted.

14. Electrophotographic reproduction element according to claim 11, wherein said binder is a combination of poly-N-vinyl-carbazole or polyvinyl pyrene with one of the following electron acceptors: 2,4,7-trinitrofluoren-9-on; 1,3,7-trinitrodibenzothiophene-5,5-dioxide; N-(2,4,7-trinitrofluoren-9-ylindene)-aniline, or p- or m-nitro-N-(2,4,7-trinitrofluoren-9ylindene)-aniline.

15. Electrophotographic reproduction element according to claim 14, wherein the mole-proportion acceptor to photoconductive polymer lies between 1 : 20 and 1 : 3.

16. Electrophotographic reproduction element according to claim 14, wherein the weight ratio pigment to binder lies between 1 : 20 and 1 : 4.

17. Electrophotographic reproduction element according to claim 11, wherein the average diameter of the azo-pigment particles does not exceed 3 μ.

18. Electrophotographic reproduction element according to claim 11, wherein the average diameter of the azo-pigment particles does not exceed 1 μ.

19. Electrophotographic reproduction element according to claim 11, wherein the thickness of the photoconductive layer lies between 2 and 30 μ.

20. Electrophotographic reproduction element according to claim 11, wherein the photoconductive layer is a composite of a plurality of coatings.

21. Electrophotographic reproduction element comprising a conductive support having thereon a photoconductive layer comprising, in dispersion in a binder consisting essentially of poly-N-vinylcarbazole containing as an electron acceptor 2, 4, 7-trinitrofluoren-9on or a condensation product of the same with aniline, a particulate bisazo naphthol compound of the formula in which R is hydrogen or a 3-chlorine atom and $R^1$ is a lower alkyl or a phenyl group, the weight ratio of binder to said bisazo naphthol compound being about 10 : 1 to about 5 : 1 and the molar ratio of binder to said electron acceptor being about 10 : 1 to about 5 : 1, the particles of said bisazo compound having an average diameter smaller than 1 micron.

22. Electrophotographic reproduction element according to claim 21, wherein R comprises a 3-chlorine atom and $R^1$ is a phenyl group.

23. Electrophotographic reproduction element according to claim 21, wherein R is hydrogen and $R^1$ is an isopropyl group.

24. Electrophotographic reproduction element according to claim 21, wherein R is hydrogen and $R^1$ is a t-butyl group.

* * * * *